(12) United States Patent
Busby et al.

(10) Patent No.: US 6,612,072 B2
(45) Date of Patent: *Sep. 2, 2003

(54) ABOVE-GROUND PLANT GROWTH AND ROOT PRUNING SYSTEM

(76) Inventors: Ray Busby, 1618 SE. 44th Pl., Bushnell, FL (US) 33513; Jack Miller, 1205 SE. Lucie Blvd., Stuart, FL (US) 34996

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/928,234

(22) Filed: Aug. 10, 2001

(65) Prior Publication Data

US 2003/0029080 A1 Feb. 13, 2003

(51) Int. Cl.[7] .................................................. A01G 9/02
(52) U.S. Cl. ......................................................... 47/65.8
(58) Field of Search ................................. 47/65.7, 65.8; 42/65.8

(56) References Cited

U.S. PATENT DOCUMENTS

| | | | | |
|---|---|---|---|---|
| 1,988,691 A | * | 1/1935 | Lovett, Jr. ................... | 206/423 |
| 2,033,627 A | * | 3/1936 | Gardner ....................... | 206/423 |
| 2,039,986 A | * | 5/1936 | Gardner ....................... | 206/423 |
| 3,775,903 A | * | 12/1973 | Pike ............................ | 47/65.8 |
| 3,872,621 A | * | 3/1975 | Greenbaum ................... | 206/23 |
| 4,209,945 A | * | 7/1980 | Dent et al. ............. | 229/117.12 |
| 4,273,495 A | * | 6/1981 | Pannell ........................ | 141/125 |
| 4,574,522 A | | 3/1986 | Reiger et al. | |
| 4,884,367 A | | 12/1989 | Lawton | |
| 5,241,783 A | * | 9/1993 | Krueger ........................ | 383/87 |
| 5,284,190 A | * | 2/1994 | Jones et al. .................. | 141/129 |
| 5,311,700 A | | 5/1994 | Thomas | |
| 5,555,675 A | * | 9/1996 | Whisenant ................... | 47/65.8 |
| 5,768,825 A | | 6/1998 | Reiger | |
| 6,041,546 A | * | 3/2000 | Baranova ........................ | 47/64 |
| 6,061,628 A | * | 5/2000 | Hayashi et al. ............. | 340/990 |
| 6,209,258 B1 | * | 4/2001 | Schneider ........................ | 47/46 |
| 6,223,928 B1 | * | 5/2001 | Sheran et al. ................ | 220/475 |
| 6,299,125 B1 | * | 10/2001 | Zayeratabat ............. | 248/218.4 |

FOREIGN PATENT DOCUMENTS

| | | | |
|---|---|---|---|
| EP | 0172060 A2 | * | 3/1986 |
| GB | 2257885 | * | 1/1993 |

* cited by examiner

Primary Examiner—Charles T. Jordan
Assistant Examiner—Jordan Lofdahl
(74) Attorney, Agent, or Firm—Van Dyke & Associates, P.A.

(57) ABSTRACT

This invention relates to a method and device for above-ground plant growth, and air root pruning which provides significant advantages over known methods of conducting above-ground plant growth and air root pruning.

16 Claims, 6 Drawing Sheets

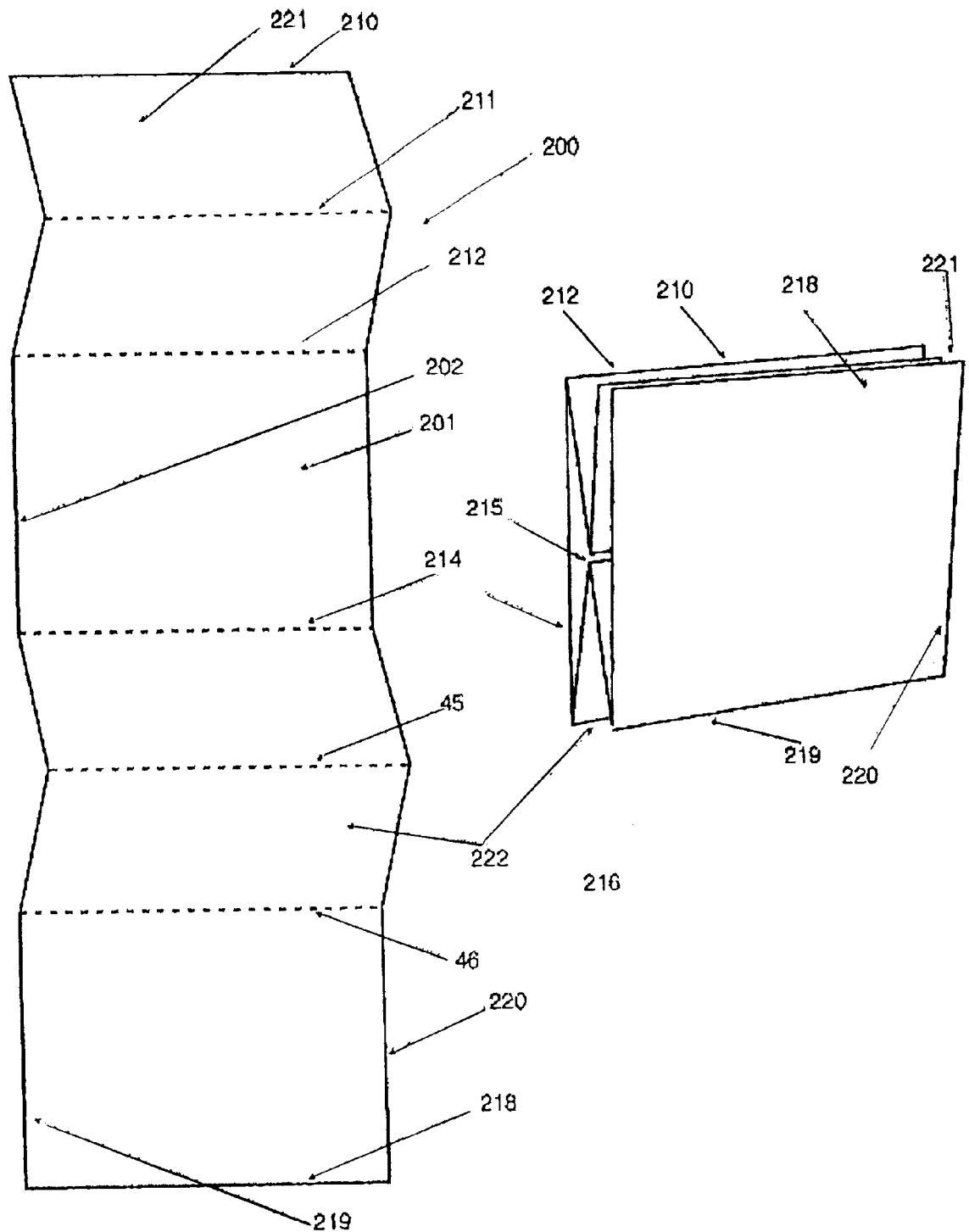

(a)          (b)          (c)

ABOVE-GROUND PLANT GROWTH AND ROOT PRUNING SYSTEM

BACKGROUND OF THE INVENTION

1. Field of the Invention

This invention relates to a method and device for above-ground plant growth and root pruning which provides significant advantages over known methods of conducting above-ground plant growth and root pruning.

2. Background Information

In the art of plant and tree horticulture, there have been efforts to develop efficient and cost-effective cultivation systems. Classically, plants, including trees, have been grown in the earth, requiring transplantation to the site of ultimate planting as needed. However, this is a labor and cost-intensive process. Accordingly, certain technologies have been developed in efforts to increase the efficiency of plant growth, including, in certain instances, methods of above-ground plant growth for subsequent transplantation into the earth.

In U.S. Pat. No. 5,768,825 (Reiger, 1998), a set-volume plant preservation bag and method was disclosed. The patent claims require an initial step of field growth of plants which are then transplanted by means of the plant preservation bag and method. The plant preservation bag has an open top, a tapered side and a bottom. The bag can be made of polypropylene, and can be placed around a bag-shaped wire frame if wanted, but is essentially a bag with a bottom, and does not expand like the device of the present invention.

In U.S. Pat. No. 4,888,914 (Reiger, 1989), a method for in-ground growth of plants prior to transplantation is disclosed. The principal purpose of the patented method and device is to control root growth during in-ground growth of the plant, to facilitate subsequent transplantation of the plant. The patent discloses and claims a method and fabric container for controlling root growth. The patent discloses that the fabric container may be made of polypropylene, but includes no discussion of what the container looks like. The picture looks like the container is possibly cylindrical in shape with a bottom. The patent makes no mention of a frame on which the fabric can be placed, and neither discloses nor suggests the idea of a radially expandable container, and is not directed at all to the issues relevant to above-ground growth methodology.

U.S. Pat. No. 5,368,353 (Flanders; Fults, 1994) is directed to a device for carrying and transportation of a burlapped plant to protect the roots of the plant during such transportation. The carrying device is basically a set of straps that connect over the plant ball to ease handling and delivering of the plant. The concept of a radially expandable plant root container is neither disclosed nor suggested.

U.S. Pat. No. 4,646,470 (Maggio, 1987), is directed to a liner for an earth ball surrounding the roots of a plant for transportation. The liner is not intended for purposes of growing the plant above ground. Rather, the patent discloses and claims a fast fit liner for an earth ball formed of a square piece of cloth material with pleats. One can use a rope or drawstring to pull the corners tight around the trunk of the plant or tree. This forms no part of the present invention.

U.S. Pat. No. 4,884,367 (Lawton, 1989), is directed to a root control system for in-ground cultivation of plants by means of a root control bag and a standard probe penetration test for the strength of the bag. The bag can be formed of polypropylene, but does not involve a relatively rigid structure for supporting above-ground plant growth.

U.S. Pat. No. 4,939,865 (Whitcomb; Stephens, 1990), discloses a container for growing transplantable plants comprised of removably joined side panels. The sides are bendable panels joined at the edges by mortise and tenon joints. Therefore, the panels can be bent to form a cylindrically-shaped container. Panels can be added to or removed from the container to increase or decrease the size of the container. Each removable panel is disclosed to be preferably made of thermoplastic material with a lattice of root trapping outwardly pointed recesses on the interior surface. Each of the recesses terminates in a hole for air-root pruning purposes. The container has no bottom and can be placed on a root impervious surface. Although the container can be expanded and is made of a thermoplastic material, there is no mention of a polypropylene fabric cover. In addition, although more panels can be added, the method is more labor intensive than the concentrically expandable device of the present invention.

U.S. Pat. No. 4,807,393 (Bracken, 1989) discloses a root ball container and method, but is not directed to a method of above-ground plant culture and devices for that purpose. Rather, this patent discloses a star-shaped root ball container constructed of a single wire with loops. The star-shaped wire just wraps snugly around the root ball.

U.S. Pat. No. 3,094,810 (Kalpin, 1960), discloses a container for plants which is essentially a semi-rigid vertical structure in which a plant may be grown or shipped. However, no provision is made for the need to expand the volume of the container as additional growth medium is added to accommodate for increased plant trunk diameter, tree and root growth. The only provision for such growth is in the vertical height of the container. The container for plants is made from some semi-rigid material such as plastic, waterproofed paper or cloth, or other suitable material. The container has a bottom with a disc-shaped device to rest in the bottom in order to give the container some support. The patent does not disclose the use of a covering over a rigid mesh structure as in the present invention.

U.S. Pat. No. 5,495,692 (LoJacono, 1996), is directed to a root protection apparatus comprising a collapsible wire basket in combination with a support strap. No provision is made for radial expansion of the volume of the container to accommodate new plant growth medium and increased plant trunk diameter. Rather, this patent discloses a collapsible wire basket that includes a support strap that can be secured across the opening of the basket. The device is for the protection of the plant from underground rodents. The wire basket is for use in a hole previously dug in the ground. The wire mesh protects against the underground rodents.

U.S. Pat. No. 1,894,506 (Wilson, 1931), discloses and claims a plant wrapping means for shipping or storing dormant nursery stock. The package is in the form of a wrapper made of paper, cellophane, burlap, oilcloth or the like and is bound by the use of a cord or wire. The patent makes no mention of the use of polypropylene fabric or the use of a rigid mesh structure, or radial expansion of a container for above-ground growth thereof.

U.S. Pat. No. 4,098,021 (Gruber, 1978) is directed to a plant container specifically directed to growth of dwarfed plants through constriction of the plant root structure. The present invention, by contrast, is directed to a method for enhancing the above-ground growth of plants. The patent discloses and claims a container made of corrosion resistant material, with a plurality of tiny holes in the wall surfaces and open on top. The patent discloses the use of stainless steel, plastics, woven or non-woven material for the container material. The container is filled with nutrient medium and the plant, and is then placed in a bigger pot that is also fitted with nutrient medium.

U.S. Pat. No. 5,454,191 (Mayeda; Mayeda, 1995), is directed to a liner for hanging basket plants. This patent neither discloses, suggests nor claims a radially expandable above-ground plant growth system. Rather, this patent discloses a hanging basket liner for lining wire or other types of hanging baskets, and is therefore far from the device and method of the present invention. The layers of the liner can consist of plastic, synthetic resinous film, non-woven fabric material made of plastic fibers and paper material, joined at a fixed seam.

U.S. Pat. No. 2,140,932 (Avery, 1938), discloses an assemblable pot or plant container, preferably made from leather. The patent neither discloses, suggests, nor claims a radially expandable plant growth container for above-ground plant cultivation. FIG. 5 of the patent discloses a plant container which has interlocking units to form a substantially cylindrical container. However, provision is only made for a single diameter. The disclosed plant container has a fibrous wall structure, containing as its main ingredient treated leather fiber. The container has sidewalls and a bottom.

U.S. Pat. No. 5,393,313 (Reiger, 1995), is directed to a method of in-ground growth of a large number of transplantable seedlings. Radial expansion of a growth container forms no part of this patent disclosure or claims. Rather, a porous fabric which is draped over the ground and previously dug holes is implemented. The fabric conforms to the shape of the holes and growing medium and plants are placed in the fabric-covered holes. Therefore, the patent does not involve the concept of a container or a mesh support structure.

In U.S. Pat. No. 5,937,577 (Butler, 1999), a cylindrically-shaped container for use in nurseries is disclosed. The container consists of wire, such as chicken wire, with a layer of woven polypropylene fabric only on the inside to permit air-root pruning. The cylinder may be placed on the ground or on any suitable material. When a container size over 25 gallons is needed, the chicken wire must be replaced with a heavier gauge wire with squares or rectangular mesh for more support. Due to the fact that the chicken wire must be pre-cut, the container cannot be expanded from its intended size, and the patent makes no mention of coiling or uncoiling the mesh to form a smaller or larger container, dependent on the growth of the plant. In addition, this patent makes no mention of the use of any other material for the support structure, besides different grades of chicken wire.

In U.S. Pat. No. 4,043,077, an expandable plant container to accommodate plant growth was disclosed. The sides of the pot are folded in an accordion-like manner, which expand in response to the growth of the plant. The pot has a bottom, which contains a drain. The pot may be made from plastic or other similar durable material. However, this patent makes no mention of a polypropylene fabric liner. In addition, the structure of the expansion mechanism is completely different from the radially expandable mechanism of the present invention.

In U.S. Pat. No. 5,241,784 (Henry, 1993), a corrugated air root pruning cylindrical container is disclosed having apertures through which plant roots may grow until air contact is made. The patent suggests that "the circumference of the container can be varied by using the apertures created for the air root pruning means 30 that are on the same horizontal axis as one of the screw holes 50 . . . The variability of the circumference also enables the nursery owner to allow the roots to expand and grow a larger plant, simply by increasing the circumference of the root pruner and adding growth medium." The patent does not disclose a mesh structure over which a porous sheet-like material, such as polypropylene, is supported. The patent makes no mention of use of a needle-punched nonwoven structure such as that preferred according to the present invention.

In U.S. Pat. No. 5,241,783 (Krueger, 1993), discloses an enclosure for plant growth comprising a closed bottom surface, side-walls and an upper enclosing surface having a slit through which a plant may grow. Accordingly, this patent is not directed to the art of air root pruning. The enclosure bears a number of seams by means of which the top, bottom and side surfaces are connected to each other. Materials mentioned for construction of the '783 device include canvas, which would severely restrict if not completely hinder the possibility of air root pruning. The present invention comprises an embodiment of a bag means which has distinct advantages over the enclosure of the '783 patent. For example, one embodiment of the present invention comprises an open top, which increases the ease of use and efficiency of production. In addition, the '783 patent, while mentioning a non-woven porous polymeric material known as DUON in the trade, the patent directly teaches away from non-woven fabrics. By contrast, the present invention identifies non-woven, needle-punched fabrics to be preferred for the air root pruning efficiency.

By contrast to the methods of the cited patents, the present invention provides, in one embodiment, a simple bag-like structure of sufficient rigidity to permit plant growth, root pruning and transplantation thereof. In a further embodiment of this invention, a rigid mesh support structure and a sheet providing multiple microscopic apertures securely draped over both sides of the rigid mesh support structure, i.e. in the sense of a sleeve. The sleeve design of the present invention has distinct advantages for keeping the tree-roots cool and provides advantages in the preparation of the containers and subsequent shipping of the plants (e.g. as by using the outer material layer to wrap the root ball).

SUMMARY OF THE INVENTION

This invention relates to a method and device for above-ground plant growth and root pruning which provides significant advantages over known methods of conducting above-ground plant growth and root pruning. The system comprises a non-woven polypropylene or like polymeric fiber fabric of sufficient rigidity in a number of different configurations to permit efficient and stable above-ground plant or tree growth, while maximizing efficiency.

BRIEF DESCRIPTION OF THE DRAWINGS

FIG. 2 provides a graphic representation of one method for making the system shown in FIG. 1.

FIG. 6A provides a view of an assembled stake while FIG. 6B shows an exploded view of a stake for use in combination with the tree cultivation and air root pruning system of this invention.

DETAILED DESCRIPTION OF THE PREFERRED EMBODIMENTS OF THIS INVENTION

Figure 1:
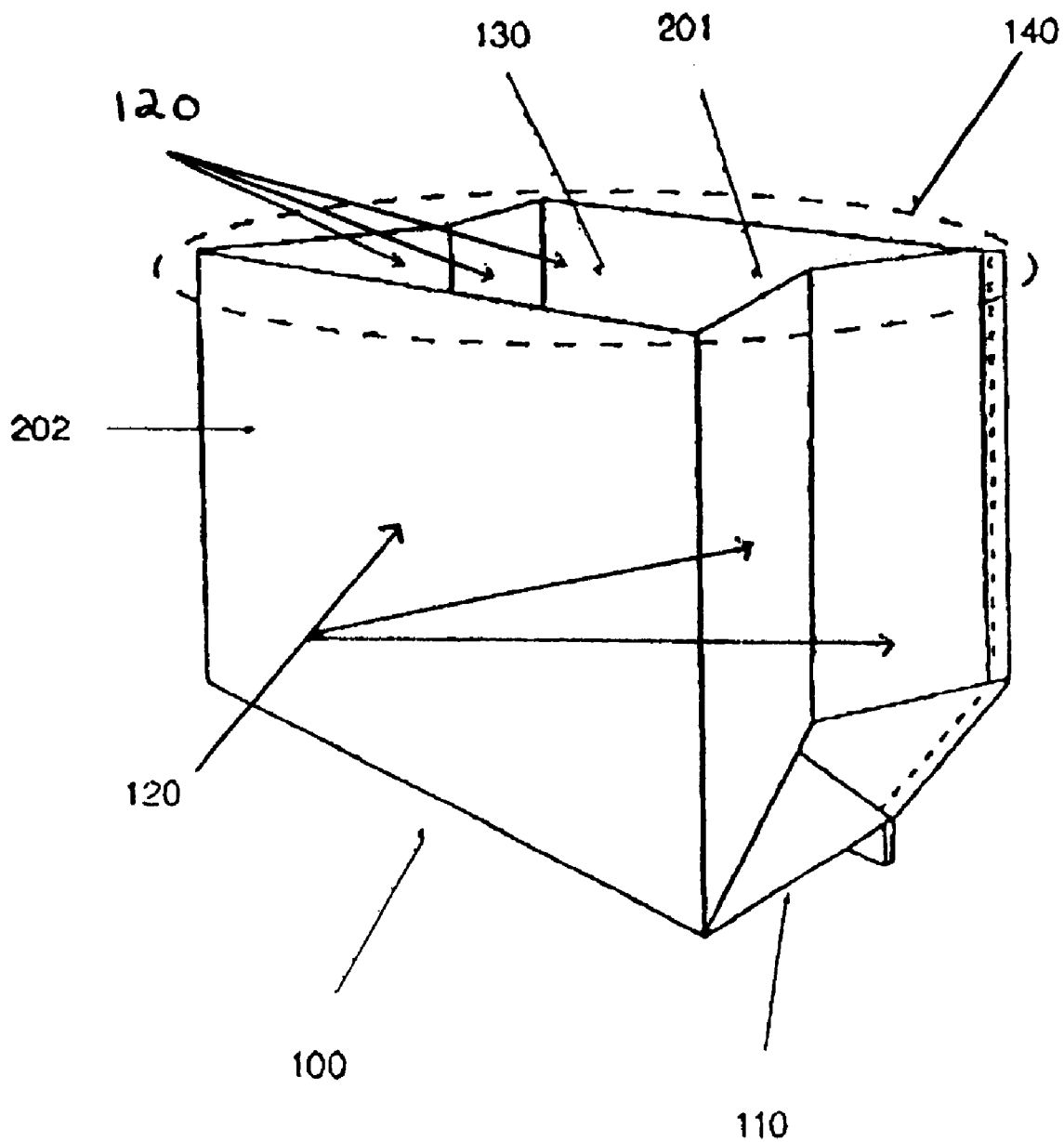
FIG. 1 provides a graphic representation of an embodiment of an above-ground plant growth and root pruning system comprising a non-woven fabric means for plant and plant-growth medium containment having a plurality of microscopic to macroscopic pores, and sufficient rigidity to permit containment of plant-growth medium and a plant installed and grown therein.

In one embodiment, this invention comprises a simple bag-like structure having a base and substantially cylindrical body when filled with soil media via an upper opening into which may be placed plant growth media. In a further embodiment of the invention the above-ground plant growth container comprises: (1) A rigid mesh structure, such as a molded plastic mesh; (2) a sheet-like covering on either side of the rigid mesh structure, preferably in the form of a sleeve of non-woven polypropylene into which the element (1) may be slid; (3) the elements (1) and (2) being sufficiently long and coiled, in a spiral fashion, to permit definition of volumes of as small as one gallon to as large as one-thousand gallons, and preferably between about one hundred and fifty and about six hundred, simply by coiling or uncoiling these elements to define a cylinder containing the desired volume. A plant-growth supporting stake may be used in combination with the plant container to assist in the initial growth of a straight, strong tree or other type of plant. In addition, a plant growth medium supply means and a sleeve loading structure are provided for as additional components of the presently disclosed and claimed system.

The above-ground plant growth and root pruning system of this invention comprises a non-woven fabric means for plant and plant-growth medium containment. The non-woven fabric means preferably has a plurality of microscopic to macroscopic pores, and sufficient rigidity to permit containment of plant-growth medium and a plant disposed therein for horticulture. In one embodiment of this invention, the non-woven fabric means for plant and plant-growth medium containment comprises a bottom layer affixed to side walls such that upon filling of the containment means with plant-growth medium, the side walls affixed to the bottom layer form a substantially cylindrical containment means. Essentially, this embodiment of the invention is a unitary bag means, which may be made in any of a number of different volumes, to contain between about one gallon and about two hundred gallons, (e.g. preferably between about one and forty-five gallons of growth medium). Preferably, the non-woven fabric means is heat treated so as to increase rigidity and stiffness of the fabric used to fashion the bag. To facilitate this, and due to good tensile strength, longevity, ultraviolet light (UV) resistance, the non-woven fabric means is substantially made from synthetic polymer fibers, such as, for example, wherein the fibers are polypropylene fibers or fibers of like polymers, including, but not limited to polyester.

One of the most significant attributes, in the choice of needle-punched heat-treated non woven polymer fabrics for use according to this invention, is the greater amount and uniform consistency of air flow over any and all other methods of soil containment in the art of above ground air-root pruning containers. For example, we have found that a woven polypropylene fabric such as that used according to Butler U.S. Pat. No. 5,937,577, tested at an air-flow of about 10–12 cubic feet per minute (CFM), although due to non-uniformity of the known woven fabrics, there are significant variations in air-flow across the known fabrics. By contrast, preferably, embodiments of the present invention using non-woven/needle-punched polymeric fabric, consistently test at air-flow generally in excess of 60 CFM, even when overlapped in spirally overlapping embodiments of this invention. Most preferably, material with a flow rate of 75 CFM or higher is used according to this invention.

The uniform porosity of the non-woven heat treated polymer fabric is also greater than any other method of soil containment in the art of above ground air-root-pruning containers. This attribute benefits in the lateral movement of soluble salts outside of the soil column through the fabric walls.

Capillary action/wicking in the non-woven fabric is an attribute that only this type of material demonstrates relative to the other materials and methods used in the air root pruning growing method. The advantage of capillary action/wicking is that when the water rises up the exterior of the container this then creates an environment that is far less harsh and more conducive to creating a more natural root zone where soil column moisture equilibrium is easily maintained. The porosity of the material also provides for superior drainage at all points of containment.

The air permeability and the capillary action providing the stable soil moisture creates a cooling effect in the root zone of the container. In addition the thickness of the material and the air permeability provides an effective insulation layer against the sun's heat.

This embodiment of the containment means for plant and plant-growth medium, in one preferred embodiment, comprises a single sheet of non-woven polypropylene folded and sewn with a high-tensile thread along a bottom surface and a side edge thereof, to form the bottom layer and the contiguous side-walls that form the substantially cylindrical containment means.

For purposes of efficiency, this embodiment of the present inventive system further comprises a means for filling a plurality of the non-woven fabric means for plant and plant-growth medium containment. In one embodiment of this invention, plant growth medium is dispensed efficiently into containers according to this invention by means of a gravity feed systems known in the art, screw augur or conveyer belt, or like means which is capable of automatically and efficiently moving large volumes of plant growth medium for dispensation thereof into a large number of bags, as necessary. In one preferred configuration, an augur or belt means is disposed centrally and has a movable dispensing spout which may be rotated clockwise or counter-clockwise for dispensation of plant growth medium into containment bags disposed in a substantially circular pattern about the dispensing means.

As a further optional component of this embodiment of the invention, a stake means for binding initial growth stages of a plant grown according to this system is employed to ensure straight growth of the plant during initial growth stages. Preferably, the stake means is a fiberglass or carbon-fiber stake, optionally comprising a ferrule into which extension stakes may be affixed as needed to accommodate plant growth beyond initial growth stages. Flexibility of the stake is desirable, so that the plant may bend with the wind and thus develop strength, while at the same time being appropriately supported and guided to grow correctly. Preferably, the flexible stake is reusable.

Referring now to FIG. 1, there is shown in detail a graphic representation of a first embodiment 100 of this invention in the form of a bag-like structure, wherein the base 110 and sidewalls 120 are formed from a highly air-transmissive fabric 120 formed preferably from needle-punched polymeric non-woven fabric. The bag-like embodiment 100 is preferably self-supporting when sufficient plant growth medium is disposed within the containment volume 130 defined therein by the base 110 and sidewalls 120. The bag-like structure has an inner surface 201 and an outer surface 202. The cylindrical outline 140 of the bag when filled with growth medium is also shown.

Referring now to FIG. 2A, in one method according to this invention, the embodiment 100 is formed starting with a linear portion 200 of an appropriate fabric, as described herein. The linear fabric portion 200 has an inside surface 201 and an outside surface 202, and is folded at appropriate seams, as shown at edge 210, folds 211, 212, 214, 215, 216, edge 218, bottom edge 219 and top edge 220. According to this method, a fold 221 is created by folding seam 211 inwardly toward seam 215 such that edge 210 lays above fold 221 and comes into contact with the outside surface 202 at seam 212. Likewise, on the other side of the fabric portion 200, seam 215 is folded inward toward seam 211 such that fold 222 is created. Next, edge 218 is folded upward and over, toward edge 210 such that edges 218 and 210 are brought into contact with each other. This accomplished, a folded fabric containment means 100 is created which is affixed in a containment form by affixing edge 218 to edge 210, and by affixing the bottom edge 219 along the entire length thereof, using preferably a high-tensile strength thread. As a result, the embodiment 100 is formed with a contained internal volume defined by the starting length of the fabric portion 200, from between about one to forty-five and up to two-hundred gallons. Those skilled in the art will appreciate, in light of this disclosure, that other methods for assembling this embodiment of the invention may be employed so long as a containment means is produced having fabric walls and base that are sufficiently strong to contain growth medium and growing plants and which is also sufficiently air-transmissive to provide efficient air root pruning functions.

The bag is ideally suited for containers in the smaller sizes, i.e. 1 to 45 gallons, due to the fact that they offer the support (sides and bottom), and hence the ability to be moved by hand where additional methods and embodiments disclosed herein are more appropriate for larger, and longer-term growth requirements of many specimen sized trees. The bags however, are capable of sizes up to two hundred gallons for many of the faster growing species of trees. The ability to be moved by hand, which is plausible in sizes of 1 through 45 gallons, is appropriate where populations per acre and hence the spacing doesn't allow or require the use of mechanization. It will further be appreciated that optional and desired inserts may be included in the bag. Thus for example, non-porous material, such as polyethylene sheeting, or any other desired insert may be included on the inside bottom surface of this and every other embodiment of this invention in order to help prevent root growth into the ground.

Figure 3A:
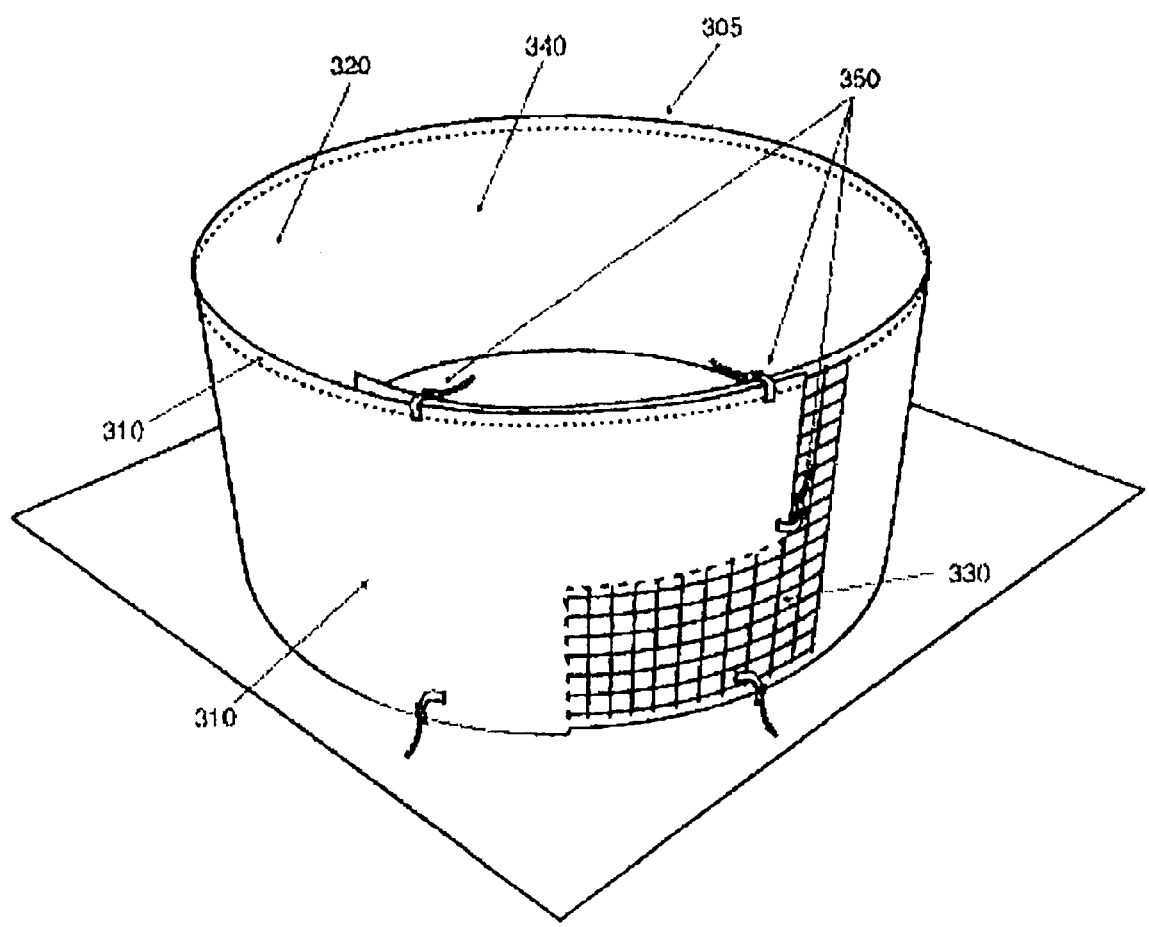
FIG. 3A provides a graphic representation of another embodiment of an above-ground plant growth and root pruning system comprising a non-woven fabric means for plant and plant-growth medium containment, said non-woven fabric means comprising a plurality of microscopic to macroscopic pores, and sufficient rigidity to permit containment of said plant-growth medium and said plant.
Figure 3B:
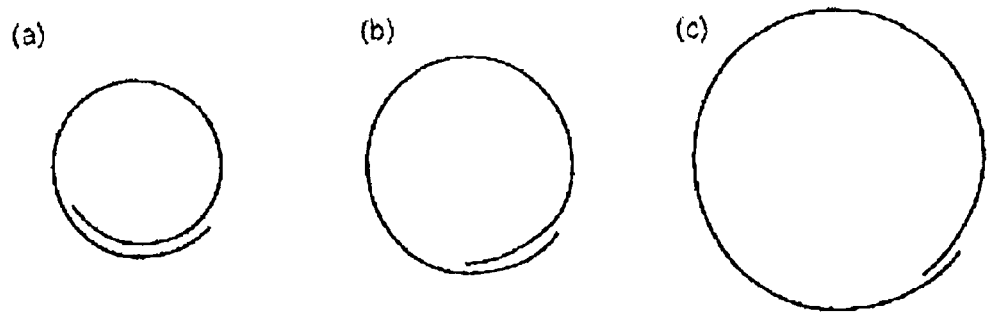
FIG. 3B shows different degrees of expansion of an expandable diameter and therefore volume.

With reference to FIG. 3A, a further embodiment 300 of the system according to this invention is disclosed. According to this embodiment, 300, non-woven fabric plant growth medium containment means 300 is fashioned in the form of a linear fabric sleeve 305 having an outer fabric layer 310 and an inner fabric layer 320 within which sleeve is disposed a rigid mesh-like structure 330. The rigid mesh 330 provides structural support and radial strength. Preferably the polymer plastic mesh is made from high quality polymer containing UV stabilizers known in the art to ensure long life and reusability. Upon completion of plant growth, for reuse, the mesh may be removed, leaving in place the non-woven fabric which may be used to protect the root ball. Plastic mesh is preferred over metal mesh, as it is more resistant to corrosion, is more economical and non-reactive, and does not create heat build up, which is a problem in solid containers. Plastic mesh is also more shape retentive, such that even if a tree is blown over, the mesh recovers its shape, while metal mesh may not. In this embodiment of the invention, the linear fabric sleeve 305 with the rigid mesh structure 330 disposed therein is coiled, to form an included internal volume 340. The total included volume 340 of this embodiment of the invention is defined both by the total length of the sleeve 305 and the degree of coil. For small included volumes 340 the containment means 300 is coiled significantly to define a relatively small volume of as little as a couple of gallons. The degree of coil of the containment means 300 is maintained by any appropriately removable fastening means 350, such as a clamp, a hook, a link, rivets, a length of rope, cable ties, UV resistant attachments, a piece of wire, or the like. As the need arises for addition of growth medium, as when the plant begins to develop beyond an initial growth phase and diameter, the removable fixation means 350 is uncoupled, permitting the coil to expand to an extent necessary to define a larger internal contained volume 340 in the form of a substantially cylindrical volume. In FIG. 3B, different volumes and diameters of the container are shown as the degree of overlap is modified.

Figure 4A:
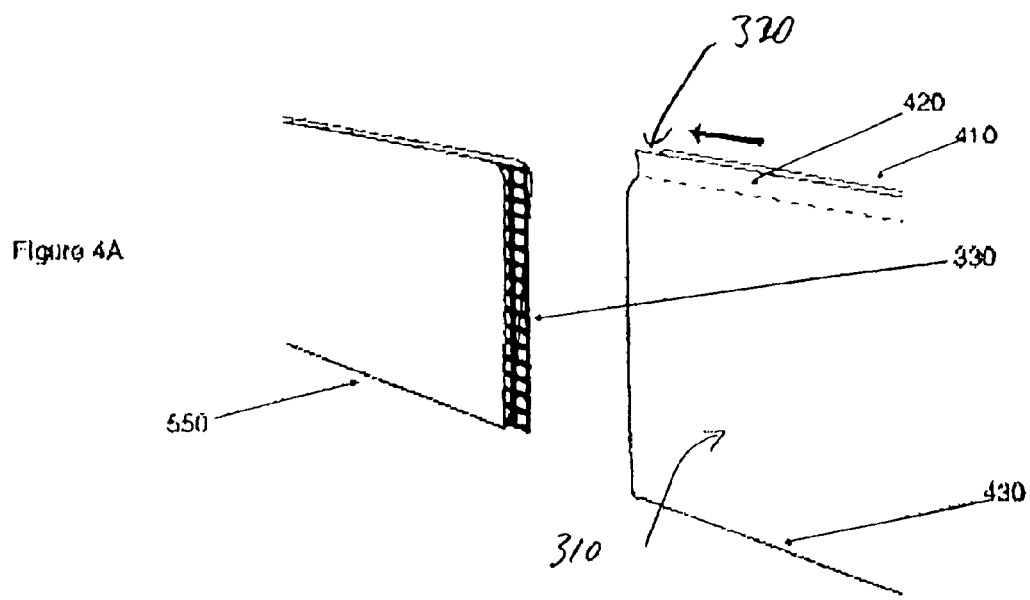
FIG. 4 provides a graphic representation of one method for making the system shown in FIG. 3.
Figure 4B:
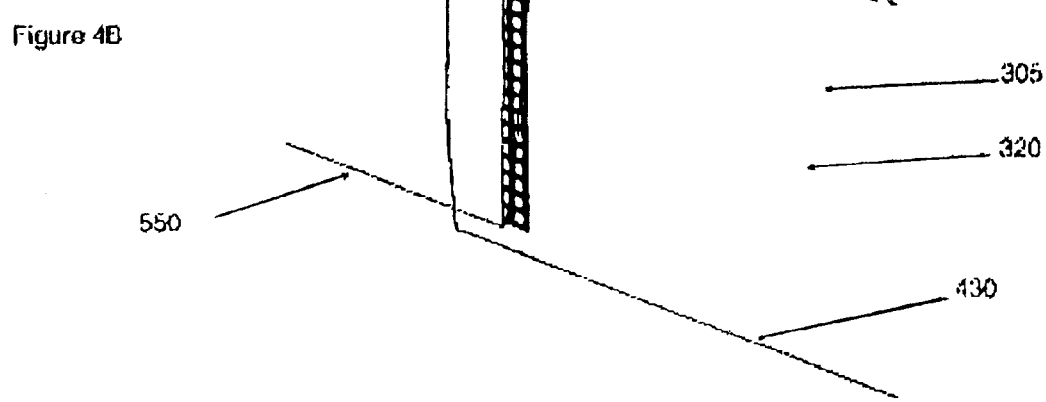
Figure 4C:
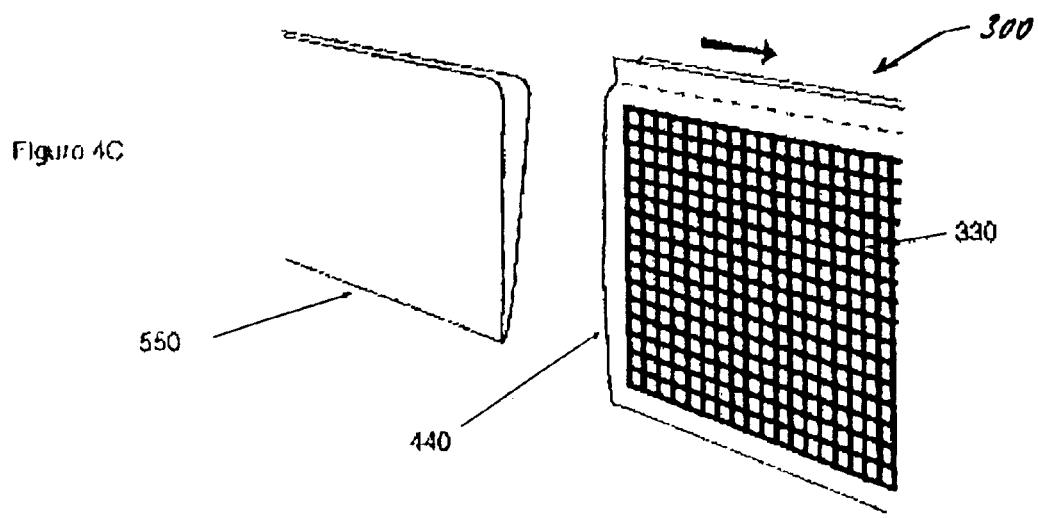

With reference to FIGS. 4A, 4B and 4C, a method for making this embodiment 300 of the invention is disclosed. In one embodiment of this method, a linear sheet of an appropriate non-woven fabric 400 as described herein, comprising a top edge 410 and a bottom edge 420 is formed into a sleeve having an outer layer 310 and an inner layer 320 by folding the top edge 410 to contact the bottom edge 420 along a median fold 430, thereby forming said linear sleeve 305. Into the volume 440 defined between the layers 310 and 320 is installed a flexible rigid mesh like structure 330. This may be easily accomplished using a sleeve installation appliance 550, such as a metallic sleeve expanding device. In this way, the rigid-mesh structure 330 is covered on both sides thereof by said non-woven fabric envelope 305. The thus formed containment means 300 is coiled as necessary to define a pre-determined contained volume within a substantially cylindrical volume. The removable fixation means 350 is then installed to maintain the coil at any desired pre-determined contained volume, into which the plant-growth medium is dispensed. The system is easily partially uncoiled as needed to increase the substantially cylindrical contained volume 340 defined by the coil to mechanically accommodate additional volumes of plant-growth medium and expanded plant diameter as plant growth proceeds, without the need to repeatedly re-transplant the growing tree or other plant, thus saving labor and minimizing transport shock to trees. Volumes of between about one to one thousand gallons, and preferably between about forty-five to six hundred gallons are easily accommodated by this system in this manner. Due to the use of an economical appropriate mesh-like structure, such as a flexible but rigid plastic, polypropylene or like synthetic mesh permits the system to be free-standing. Optionally, the system may also include a bottom layer of solid material, or woven or non-woven fabric to diminish root growth into the ground, or impenetrable material to eliminate root growth into the ground.

We have found that the two-layer embodiment according to this invention provides unexpected advantages with respect to keeping roots cool, (due to the presence of an air layer between the outside of the containment means and the inner layer, as described above), avoiding heat damage to roots, and increasing the level of air penetration.

Figure 5A:
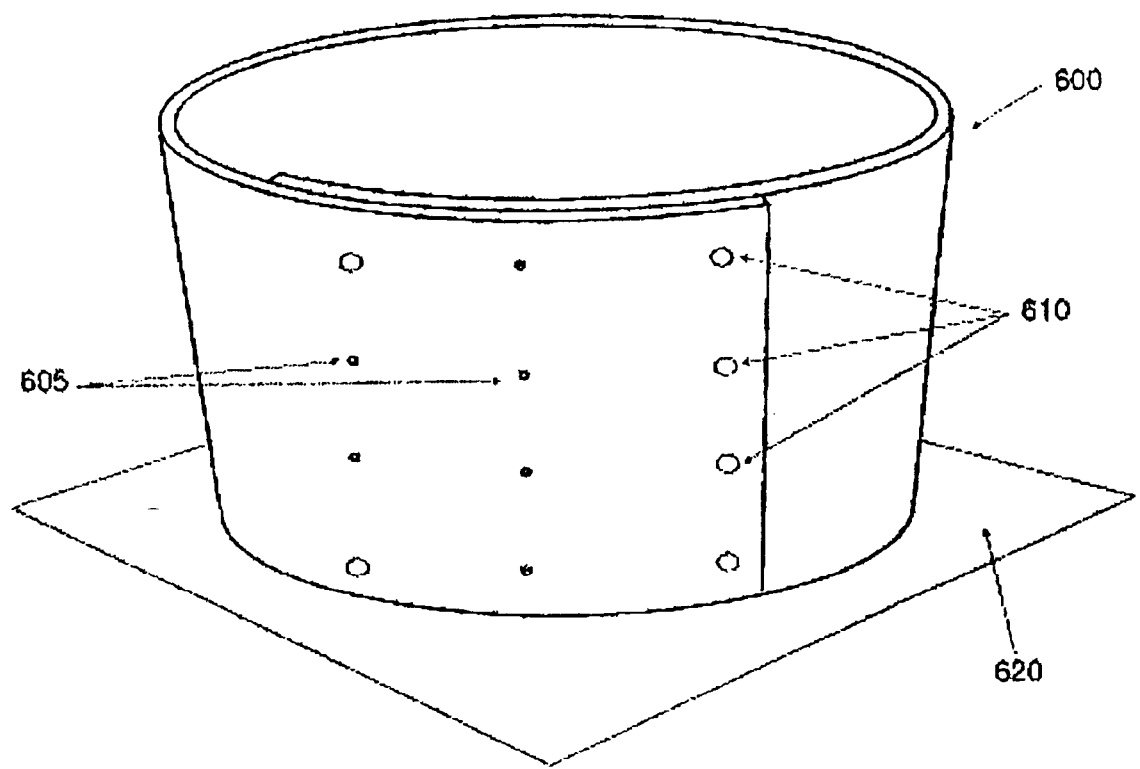
FIG. 5A provides a view of a no mesh embodiment of the present invention which is retained in vertical orientation due to the stiffness of the fabric chosen for this embodiment and adequate use of grommets, nuts and bolts, screws, pins or like fastening means, shown in FIGS. 5B and 5C.
Figure 5B:
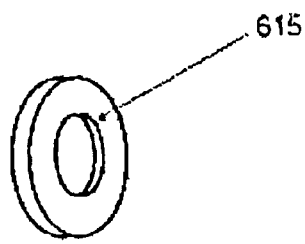
Figure 5C:
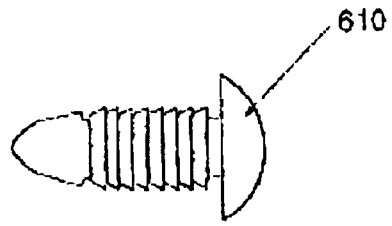

The non-woven expandable container in the absence of a mesh is ideally suited for container sizes of 15 to 150 gallons, with several different heights and finished sizes provided. With reference to FIGS. 5A, 5B and 5C, there is shown this embodiment 600 of the invention, whereby the overlapping layers of rigid fabric are affixed to each other by means of, for example, barbs 610 and locking washers 615 which are fixed through grommet holes 605. The fabric may be a single layer or a double layer, as shown in FIG. 4, but without the mesh support. Alternatively, a single layer of sufficiently rigid material stock is chosen to form the desired length which is then coiled to define the desired volume. The non-mesh reinforced expandable container 600 is constructed of a high strength non-woven material that is specifically manufactured to provide sufficient rigidity, allowing it to stand upright without the additional support of the reinforcing mesh, and the retention of shape without stretching (a defect which is common to non-woven fabrics that have not been developed to the level of strength and utility of the present invention). The additional benefits of this methodology are not limited to the retention of shape and rigidity. This is a rolled product that is die cut, thus providing perforations and scoring, and it can also be die cut to provide fastener holes that are appropriately spaced. Preferably, a plastic barb fastener with an appropriate washer is used for rapid installation of this embodiment while in the field of use. The fabric can also be secured with the use of the hook portion of hook and loop fastening (Velcro) by virtue of the non-woven fabrics' similar construction to the loop portion of said hook and loop type fastening. This quick and simple set-up of the cylinder with the attachment of the overlapping ends to construct the desired size container/cylinder in the field is facilitated when material for assembly is rolled out and removed from the master roll. A sheet of fabric or other material 620 is provided to help prevent or eliminate tree root growth into the ground as preferred.

The cost savings over all prior methods to be realized by the end users of the present invention are manifested in a number of ways. The simplicity of fabrication in the converting/manufacturing stage, the efficiency of space in transportation, storage, and efficiency during final field handling, all manifest greater efficiencies, and thus, cost savings.

The method of field fabrication is as simple as rolling out the non-woven material from a trailer mounted spool, then removing the predetermined size/length and then fastening at the appropriate location using either the pre-placed holes and the appropriate mechanical fastening device utilizing said holes or by the Velcro type hook material that has been placed in the appropriate location to create the desired sized container. The cylinder thus formed is then placed on a variety of bottoms, i.e. non-woven material, porous tightly woven material, and non-porous polyethylene sheeting, depending on the preference of the user, desired results, and crop to be grown.

In a further embodiment of this invention, tree container sizes from 1 to 1000 gallons are provided for. The components are all UV resistant, non-reactive, and provide significant strength and longevity for very large and or slow growing specimens.

This container is fundamentally a polypropylene rigid mesh structure covered by an envelope of non-woven material. The purpose of the mesh is to provide strength and rigidity to the container as well as air space that then provides an insulating feature. This mesh was chosen because of the attributes that are significant improvements over other types of rigid containment methods; i.e. non-corrosive, non-reactive, resilience to impact and indentation, ease of cutting, safer in the workplace, with greater durability and longevity.

The envelope design of this method of air root pruning container provides the added feature of insulation and cooling of the root mass by virtue of the twin wall design which is assured by the inclusion of the mesh that keeps the two sides of the non-woven envelope separated with an air layer.

As with the expandable above ground non-woven air root pruning tree container embodiment of this invention described herein, the bottom treatment is determined by the preference and choice of the grower as dictated by the desired results, and crop to be grown.

In forming the fabric for the system according to this invention, the fabric means is preferably heat treated so as to increase rigidity and stiffness of the fabric. For this purpose, synthetic polymer fibers, such as but not limited to polypropylene fibers, may be employed. Preferably the non-woven fabric is entangled by needling boards during manufacture to ensure excellent air transmissivity, increased strength and rigidity. We have found that the non-woven fabric according to this invention, even at heavier densities, has better air transmissivity than almost any other material we have tested, or any materials currently used for this purpose on the market. In addition, as with the above described embodiment 100, the system may further comprise a means for filling a plurality of this embodiment of non-woven fabric means for plant and plant-growth medium containment. Additionally, a stake means for binding initial growth stages of a plant is employed to ensure straight growth of plants during initial growth stages as required by the industry determined grades and standards. Preferably, the stake means is a fiberglass or carbon-fiber stake, optionally comprising a ferrule into which extension stakes may be affixed as needed to accommodate plant growth beyond initial growth stages. Preferably, the stake is a composite fiberglass rod with UV stabilizers for long life and reusability. The stake preferably has a smooth side surface, and is thus less injurious to tree bark than bamboo and metal stakes. In addition, it has been noted in recent years that bamboo stakes imported from the orient may contain a beetle or other insect which may be injurious to the growing tree. Different tree stakes of different lengths and diameters may be chosen for specific tree types and specific growth stages, to help maximize the strength of the growing tree.

Figures 6A, 6B:
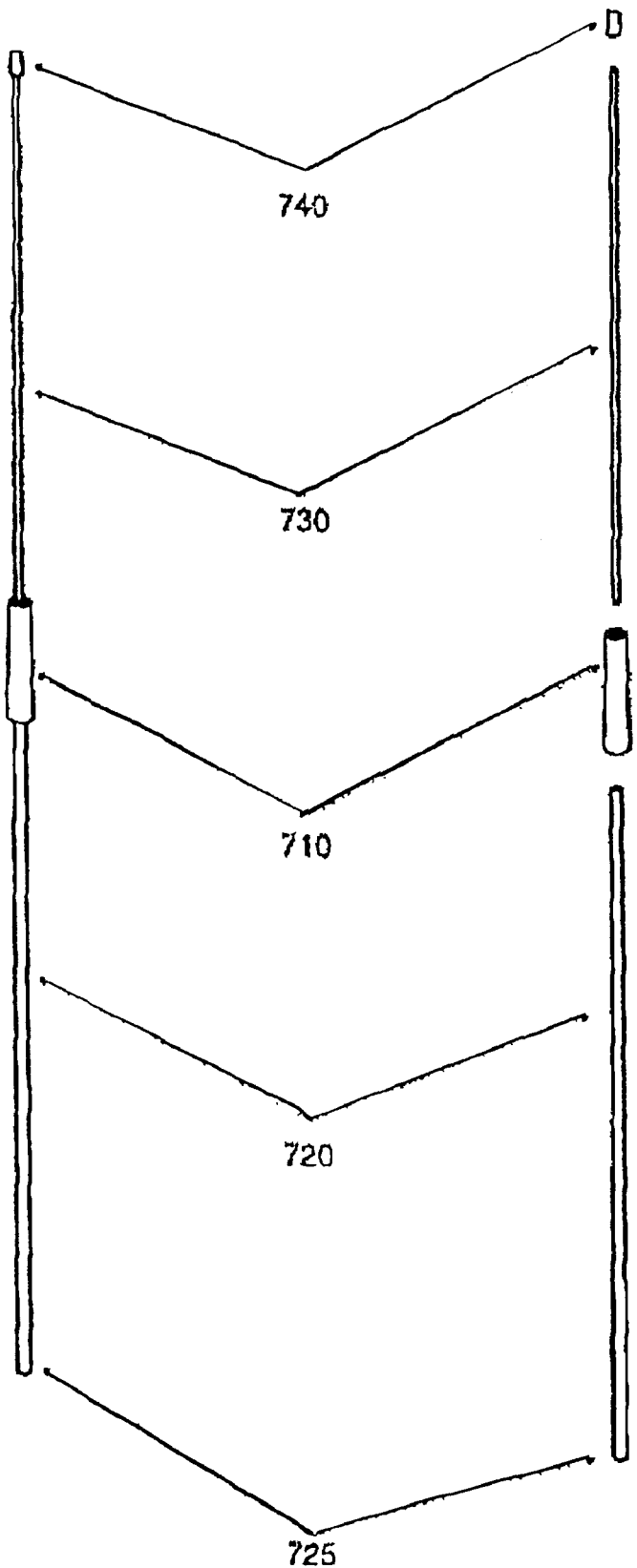

This stake is flexible, compared to what is currently available and historically used, which are rigid. This facilitates movement and bending from the wind, which strengthens the trunk, roots, and develops greater trunk caliber. All of these attributes contribute to the tree meeting desired industry grades and standards. Conversely, when a rigid stake is used, the opposite occurs, contributing to the weakening of the tree. Referring now to FIG. 6, there is shown one embodiment of the stake 700 according to this invention. A ferrule 710 permits extension of the stake, as needed, by affixing a lower rod 720 of between about two to nine feet long to an upper rod 730 of between about one to four feet in length. An end 725 of the stake is inserted securely into the soil adjacent the base of the growing tree, and the tree is then attached to the stake to provide support. A nib 740 is provided to protect the upper tip of the stake and to prevent fray. FIG. 6A shows the assembled stake and FIG. 6B shows the exploded stake.

For purposes of large-volume production of the containment means and air-root pruning system of this invention, it is convenient to define precut or scored rolls of the appropriately treated and weighted fabric for use according to this invention. For example, not meant to be limiting, the present system may be optimized by defining precut linear lengths of fabric for assembly into the containment means defined herein.

As noted above, the fabric for use according to this invention is preferably a non-woven polymer, such as but not limited to, polypropylene which has been heat-fused by calendaring (passage of the fabric over a heated rod), heat-treated, by UV, gas, infra-red, or other means known in the art), to reduce stretching, and selected at an appropriate density to provide the necessary air transmissivity in combination with required tensile strength and rigidity. One preferred method for heat treatment of lighter weight material may be by calendaring. One commercial source for appropriate material for use according to this invention is from Synthetic Industries, 428 Rollins Industrial Blvd., Ringold, Ga. 30736. Polyester fiber materials, nonwoven nylon fibers and the like may also be used according to the present invention. Additives, such as carbon black, hindered amines, for UV resistance, are optional but desirable, to permit re-use of the containment means according to this invention.

One of the most significant attributes, in the choice of needle-punched heat-treated non woven polymer fabrics is the greater amount and uniform consistency of air flow over any and all other methods of soil containment in the art of above ground air-root pruning containers. For example, we have found that a woven polypropylene fabric such as that used according to Butler U.S. Pat. No. 5,937,577, tested at an air-flow of about 10–12 cubic feet per minute (CFM), while preferably, embodiments of the present invention using non-woven/needle-punched polymeric fabric, consistently test at air-flow rates of 75 CFM or higher.

The uniform porosity of the non-woven heat treated polymer fabric is also greater than any other method of soil containment in the art of above ground air-root-pruning containers. This attribute benefits in the lateral movement of soluble salts outside of the soil column through the fabric walls, as well as the removal of excess water which is often the cause of root disease.

Capillary action/wicking in the non-woven fabric is an attribute that only this type of material demonstrates relative to the other materials and methods used in the air root pruning growing method. The advantage of capillary action/wicking is that when the water rises up the exterior of the container this then creates an environment that is far less harsh and more conducive to creating a more natural root zone where soil column moisture equilibrium is easily maintained. This capillary action is not possible with any other above-ground air root pruning container methods of which we are aware.

The air permeability and the capillary action providing the stable soil moisture creates a cooling effect in the root zone of the container. In addition the thickness of the material and the air permeability provides an effective insulation layer against the sun's heat.

In light of the foregoing disclosure, those skilled in the art will appreciate that this invention further provides a method for above-ground culture of a plant which comprises planting a seedling or small tree in a growth medium contained within an above-ground plant growth and root pruning system comprising a non-woven fabric means for plant and plant-growth medium containment. As noted above, the non-woven fabric means includes a plurality of microscopic to macroscopic pores, while at the same time, the fabric is of sufficient rigidity to permit containment of the plant-growth medium and growing plant.

Having generally described this invention, including its best mode and preferred embodiments, reference is now made to the claims appended hereto, which define the invention herein disclosed, and which should not be restricted to the specifics as herein defined.

What is claimed is:

1. An above-ground plant growth and root pruning system comprising:
    a non-woven fabric means for plant and plant-growth medium containment, said non-woven fabric means:
        (a) being made of a needle-punched, polymer fabric that
            (i) comprises a plurality of microscopic to macroscopic pores such that said fabric comprises an air-flow of about 60 CFM or higher and permits root growth into the ground when said non-woven fabric means is placed above ground, and
            (ii) is heat treated so that said fabric comprises sufficient rigidity to increase ease of use in containment of said plant-growth medium and said plant when said non-woven fabric means is placed above ground; and
        (b) comprising a bottom layer affixed to side walls such that, upon filling of said non-woven fabric means with plant-growth medium and said plant, said side walls affixed to said bottom layer form a substantially cylindrical, self-supporting containment means comprising an open top.

2. The system according to claim 1, wherein said non-woven fabric means is substantially made from synthetic polymer fibers to form a polymeric fabric.

3. The system according to claim 2, wherein said fibers are polypropylene fibers, polyester fibers, or combinations thereof.

4. The system according to claim 2, wherein said means for plant and plant-growth medium containment comprises a sheet of polymeric fabric folded and sewn with a high-tensile thread along a bottom surface and a side edge thereof, to form said bottom layer and said substantially cylindrical containment means.

5. The system according to claim 1 further comprising a means for filling a plurality of said non-woven fabric means for plant and plant-growth medium containment.

6. The system according to claim 5 wherein said means comprises a plant growth medium screw augur, gravity feed means, or conveyer belt.

7. The system according to claim 1 further comprising a stake means for binding initial growth stages of a plant grown according to said system to ensure straight growth of said plant during said initial growth stages.

8. The system according to claim 7 wherein said stake means is a fiberglass or carbon-fiber stake, optionally comprising a ferrule into which extension stakes may be affixed as needed to accommodate plant growth beyond said initial growth stages.

9. The system according to claim 1 comprising said non-woven fabric in the form of a linear fabric sleeve or a single relatively rigid layer of non-woven fabric coiled so as to define a contained volume and affixed at said defined volume into which said pant-growth medium is disposed.

10. The system according to claim 9 wherein said system is assembled by means of interlocking closure means inserted through specifically located holes, grommets, or like re-enforcing means in said fabric.

11. A method for above-ground culture of a plant which comprises planting a seedling or small tree in a growth medium contained within an above-ground plant growth and air root pruning system comprising a non-woven fabric means for plant and plant-growth medium containment, said non-woven fabric means:
   (a) being made of a needle-punched, polymer fabric that
      (i) comprises a plurality of microscopic to macroscopic pores such that said fabric comprises an air-flow of about 60 CFM or higher and permits root growth into the ground when said non-woven fabric means is placed above ground, and
      (ii) is heat treated so that said fabric comprises sufficient rigidity to increase ease of use in containment of said plant-growth medium and said plant when said non-woven fabric means is placed above ground;
   (b) comprising a bottom layer affixed to side walls such that, upon filling of said non-woven fabric means with plant-growth medium and said plant, said side walls affixed to said bottom layer form a substantially cylindrical, self-supporting containment means comprising an open top.

12. The method according to claim 11 wherein said above-ground means for plant and plant-growth medium containment comprises a single sheet of non-woven polypropylene folded and sewn with a high-tensile thread along a bottom surface and a side edge thereof, to form said bottom layer and said substantially cylindrical containment means.

13. A non-woven polymeric fabric air root-pruning container comprised of needle-punched non-woven polymer fabric and configured such that said container is radially expandable, whereby as a plant disposed in said container grows larger, said container can be adjusted to accommodate said growing plant without removing said growing plant from said container.

14. The system of claim 1, wherein said non-woven fabric means comprises an insert disposed therein to limit or preclude root growth out of a portion of said non-woven fabric means.

15. The container of claim 13, wherein said container is placed on a material that limits or precludes root growth out the bottom of said container.

16. The system of claim 1 wherein said non-woven fabric means is comprised of a continuous piece of said needle-punched, polymer fabric, wherein said non-woven fabric means is folded and sewn to produce the collapsible configuration shown in FIG. 1.

* * * * *